US010070195B1

(12) United States Patent
Brandwine et al.

(10) Patent No.: US 10,070,195 B1
(45) Date of Patent: Sep. 4, 2018

(54) COMPUTING RESOURCE SERVICE SECURITY METHOD

(75) Inventors: Eric Jason Brandwine, Haymarket, VA (US); Nathan R. Fitch, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 333 days.

(21) Appl. No.: 13/370,214

(22) Filed: Feb. 9, 2012

(51) Int. Cl.
*G06F 21/00* (2013.01)
*H04N 21/488* (2011.01)

(52) U.S. Cl.
CPC ......... *H04N 21/4882* (2013.01); *G06F 21/00* (2013.01)

(58) Field of Classification Search
USPC ................ 726/22–25; 709/223–229
See application file for complete search history.

(56) References Cited

U.S. PATENT DOCUMENTS

| | | | | |
|---|---|---|---|---|
| 5,884,033 | A * | 3/1999 | Duvall et al. | 709/206 |
| 6,470,384 | B1 * | 10/2002 | O'Brien et al. | 709/223 |
| 7,555,776 | B1 * | 6/2009 | Lymer et al. | 726/22 |
| 7,827,611 | B2 * | 11/2010 | Kouznetsov et al. | 726/24 |
| 8,015,114 | B1 * | 9/2011 | Nachenberg | 705/59 |
| 8,111,154 | B1 * | 2/2012 | Puri et al. | 340/539.13 |
| 8,230,502 | B1 * | 7/2012 | Lymer et al. | 726/22 |
| 8,239,941 | B1 * | 8/2012 | Lymer et al. | 726/23 |
| 8,271,642 | B1 * | 9/2012 | Sankararaman et al. | 709/224 |
| 8,418,223 | B1 * | 4/2013 | Smith et al. | 726/1 |
| 8,434,126 | B1 * | 4/2013 | Schepis et al. | 726/1 |
| 8,571,538 | B2 * | 10/2013 | Sprigg et al. | 455/419 |
| 2009/0019170 | A1 * | 1/2009 | Wyss et al. | 709/229 |
| 2009/0187651 | A1 * | 7/2009 | Schuckenbrock et al. | 709/224 |
| 2010/0235923 | A1 * | 9/2010 | Schepis et al. | 726/26 |
| 2011/0061111 | A1 * | 3/2011 | Faitelson et al. | 726/28 |
| 2012/0011573 | A1 * | 1/2012 | Menasce et al. | 726/4 |
| 2012/0023548 | A1 * | 1/2012 | Alfano et al. | 726/2 |
| 2012/0173356 | A1 * | 7/2012 | Fan et al. | 705/26.1 |

(Continued)

OTHER PUBLICATIONS

Norton Family Safety Advice (Norton Online Family Webpage by Symantec at url: https://onlinefamily.norton.com/familysafety/advice.fs retrieved from http://web.archive.org dated Oct. 26, 2011.*

(Continued)

*Primary Examiner* — Morshed Mehedi
*Assistant Examiner* — Richard A McCoy
(74) *Attorney, Agent, or Firm* — Seed IP Law Group LLP

(57) ABSTRACT

Techniques are described for providing users with computing resources, such as to enable users to interact with a remote configurable computing resource service in order to create and configure computing resources that are provided by the configurable computing resource service for use by the users. Computing resources provided by the configurable computing resource service may be configured to be private computing resources that are accessible only by the users who create them. The configurable computing resource service provides one or more interfaces that allow a user to provide to the computing resource service an indication of a security concern related to the provided computing resources, and responds to a received indication of a security concern by taking one or more actions to secure the provided computing resources.

26 Claims, 7 Drawing Sheets

(56) References Cited

U.S. PATENT DOCUMENTS

2012/0203725 A1* 8/2012 Stoica ............................. 706/46
2013/0040604 A1* 2/2013 Sprigg et al. ................. 455/410

OTHER PUBLICATIONS

Norton Online Family Demo (a YouTube video at url https://www.youtube.com/watch?v=Wl-jltHs-_I uploaded on Jul. 17, 2009 by Symantec.*

Norton Online Family Premier vs. Free comparison chart by Symantec(retrieved from url https://onlinefamily.norton.com/familysafety/basicpremium.fs retrieved from http://web.archive.org/ archived on Apr. 9, 2011.*

\* cited by examiner

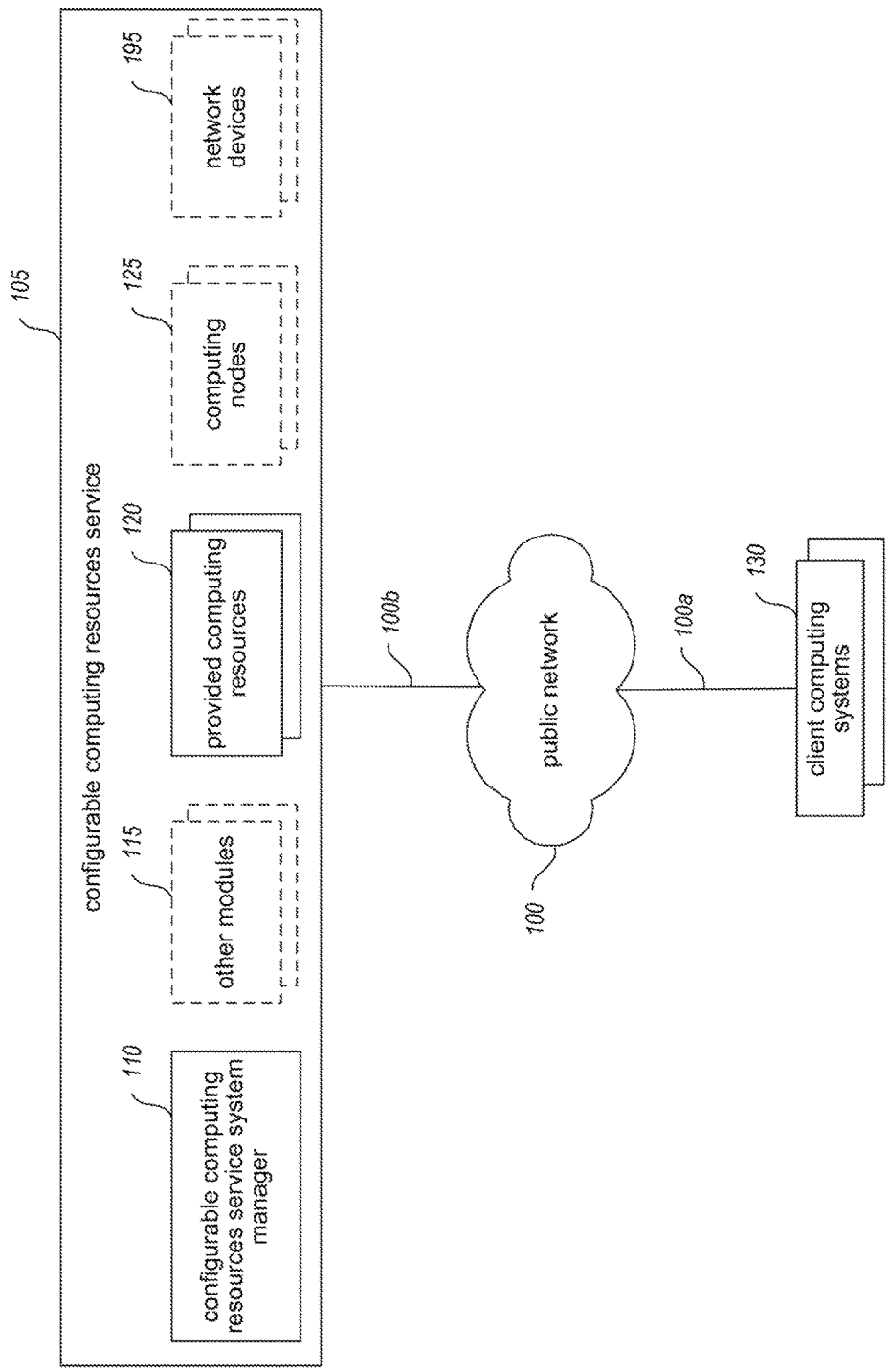

COMPUTING RESOURCE SERVICE SECURITY METHOD

BACKGROUND

The advent of virtualization technologies for commodity hardware has provided benefits for many customers with diverse needs, allowing various computing resources to be efficiently and securely shared between multiple customers. For example, virtualization environments such as those provided by VMWare, XEN, Hyper-V and User-Mode Linux may allow one or more physical computing machines to be shared among multiple users by providing each user with one or more virtual machines hosted by one of the physical computing machines. Each such virtual machine may be a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems, etc.

BRIEF DESCRIPTION OF THE DRAWINGS

FIG. 1 is a network diagram illustrating example embodiments of interactions that involve remote clients creating, configuring and managing computing resources.

DETAILED DESCRIPTION

Figure 2A:
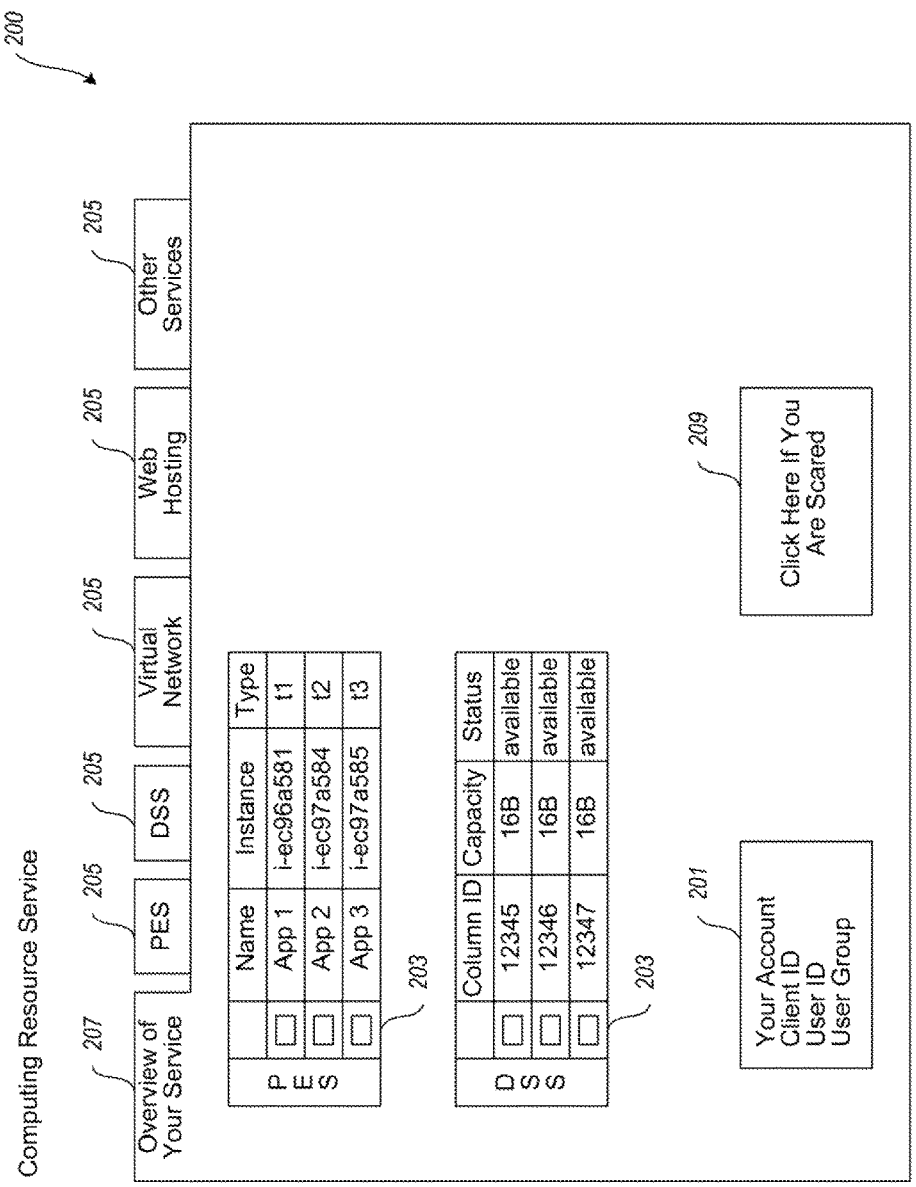
FIGS. 2A-2C are illustrations of example embodiments of displays that may be employed by a system for providing computing resources for use by remote clients.

Techniques are described for managing access of users to computing resources, such as under the control of a configurable computing resource service available to remote users. In at least some embodiments, a remote user may interact with a configurable computing resource service over public networks in order to create and configure computing resources, such as a computer network, virtual computing sessions, data storage resources, stored objects and data, etc., for use by the user, with the configured computing resources being provided by the configurable computing resource service and including multiple computing nodes, data storage servers, etc., that are maintained by or otherwise under the control of the configurable computing resource service. After configuring such computing resources, the user may interact from one or more remote locations with the computing resources being provided to the user by the configurable computing resource service, such as to execute programs on computing nodes of a provided computer network, to store or retrieve objects on provided data storage servers, etc. The configurable computing resource service may provide one or more interfaces to facilitate the user creating, configuring and managing the provided computing resources. In at least some embodiments, the one or more provided interfaces enable a user to provide an indication of a security concern to the configured computing resource service, and the service takes one or more actions to secure the provided computing resources in response to the received indication. For example, an interface may contain a button or link which a user may select to send an indication to the service of a security concern. The configurable computing resource service may in at least some embodiments be a fee-based service, such that users of the configurable computing resource service are customers that pay fees to the configurable computing resource service for at least some of the functionality provided by the configurable computing resource service. In addition, in at least some embodiments, some or all of the described techniques are automatically performed by embodiments of a configurable computing resource service manager module, optionally in conjunction with other computing resource service manager modules, as described in greater detail herein.

In at least some embodiments, at least some of the computing resources provided by the configurable computing resource service are private computer networks that are accessible only by the users of the configurable computing resource service on whose behalf the provided computer networks are created and configured (or by others for whom access is explicitly configured). For example, the configurable computing resource service may provide a user who is a client of the configurable computing resource service with secure private access to a computer network provided for the client, such as by enabling a VPN ("virtual private network") connection or other secure connection between one or more remote computing systems of the client and the provided computer network, or may use other security and/or authentication techniques to enable the client to remotely interact with the provided computer network in a private and secure manner.

In at least some embodiments, at least some of the computing resources provided by the configurable computing resource service are data storage resources that are accessible only by the users of the configurable computing resource service on whose behalf the provided data storage resources are created and configured (or by others for whom access is explicitly configured). For example, the configurable computing resource service may provide a user who is a client of the configurable computing resource service with secure private access to an object stored by the provided data storage resources on behalf of the client, such as enabling storage, retrieval or releasing of an object, or may use other security and/or authentication techniques to enable the client to remotely interact with the provided data storage resources in a private and secure manner. The provided computing resources may include data storage resources such as data storage servers, stored objects, stored data, storage volumes, etc.

Clients of the configurable computing resource service may create and configure computing resources provided by the configurable computing resource service in various manners in various embodiments. In at least some embodiments, the configurable computing resource service provides one or more APIs ("application programming interfaces") that enable computing systems of clients to programmatically interact with the configurable computing resource service to perform some or all actions in creating, configuring, and initiating use of computer resources provided by the configurable computing resource service, while in at least some embodiments users who are clients of the configurable computing resource service may interactively interact with the configurable computing resource service to perform some or all such actions (e.g., via a GUI, or graphical user interface, or other console provided by the configurable computing resource service), whether instead of or in addition to performing such actions via use of such APIs. In some embodiments, a GUI available to users may be based on an underlying API that is alternatively available to users, while in other embodiments a GUI may be implemented in other manners. In addition, interactions between computing devices of clients and the configurable computing resource service may be based at least in part on electronic messages (e.g., email messages) sent between the client computing devices and the configurable computing resource service, such as in accordance with a message-based API of the configurable computing resource service.

In addition, in at least some embodiments, the computing nodes used by the configurable computing resource service to provide computing resources to clients may have various forms, such as physical computing systems and/or virtual machines that are each hosted on one or more physical computing systems. For example, in some embodiments, the configurable computing resource service may include a large number of computing nodes that are provided by the configurable computing resource service to be available for use in computing resources provided to clients, such as in one or more data centers in one or more geographical locations. In addition, in at least some embodiments, some or all of the computing nodes provided by the configurable computing resource service are interconnected by one or more intermediate physical networks, and the computer networks provided to clients may be virtual (or "logical") networks that are overlaid over the intermediate physical networks by using the intermediate physical networks as a substrate network. Furthermore, in at least some embodiments, at least some of the computing nodes may be used by a program execution service (or "PES") that executes multiple programs on behalf of multiple customers or other users of the program execution service, by a data storage service (DSS) that stores data, such as multiple data objects, on behalf of multiple customers or other users of the data storage service, etc.

In some embodiments, a client may further configure a computing resource provided by the configurable computing resource service to provide access to one or more other network-accessible services that are remote from the provided computing resource, such as other remote network-accessible services that are accessible over the Internet or other public networks, or that are otherwise external to and not part of the provided computing resources. At least some such remote services may in some embodiments be affiliated with the configurable computing resources service (e.g., provided by an operator of the configurable computing resource service or an affiliated entity; provided by another client of the configurable computing resource service, such as via a computer network being provided to that other client by the configurable computing resource service, etc.), and at least some such remote services in some embodiments may instead be independent of the configurable computing resource service. Such other remote services may have various forms in various embodiments, including services that provide network access to one or more types of computing-related resources (e.g., storage services that provide access to stored data resources, messaging services that provide access to message queue resources or other stored message resources, database services that provide access to stored database resources, program execution services that provide access to program execution resources, etc.) for use by remote computing systems, or that otherwise provide access to information or functionality or other resources of use (e.g., a service that provides stock quote information resources or search query results resources; a service that provides photo sharing functionality resources or social networking capability resources; etc.). In some situations, an embodiment of the configurable computing resource service may provide a plurality of computing nodes at a data center or other geographical location, and may use subsets of those computing nodes to provide different computing resources to different clients (e.g., with each provided computer network being a distinct virtual network that shares a common substrate network)—in such situations, one client may configure the provided computing resources for that client to provide access to one or more network-accessible remote services that are provided by other of the clients using other of the provided computing resources at that geographical location, such as without the one client being aware that those remote resources are physically provided by other computing nodes at the same geographical location.

In at least some embodiments, the configurable computing resource service further provides an API that enables clients to programmatically interact with the configurable computing resource service to cause the configurable computing resource service to take actions that facilitate establishing and controlling remote access of the clients and others to the computing resources provided to them by the configurable computing resource service. Such a remote access establishment API may perform various actions in various embodiments, and in at least some embodiments assists a client in establishing and controlling access from a remote location of the client to the computing resource being provided for the client by the configurable computing resource service.

Clients of a configurable computing resource service may be at least partially responsible for the security of the provided computing resources. For example, clients may typically establish user credentials, configure data storage policies, establish security groups and permissions, etc. However, clients may make mistakes and dishonest users may attempt to gain inappropriate access to provided computing resources. Thus, occasionally, security incidents may happen. In at least some embodiments, the configurable computing resource service provides functionality to secure provided computing resources in response to an indication from a client of a security concern. For example, a client may be provided with one or more buttons in one or more displays of a GUI provided by an API, and may provide an indication of a security concern by selecting one or more of the provided buttons. In at least some embodiments, the configurable computing resource service may respond to such an indication by denying all access to provided computing resources or a subset thereof (e.g., revoking access keys, denying data access requests, deny access to groups of users, etc.). In at least some embodiments, the configurable computing resource service may respond to such an indication by conducting an analysis to determine whether one or more provided computing resources are being inappropriately accessed, and when the analysis indicates one or more of the provided computing resources are being inappropriately accessed, restricting access to the one or more provided resources the analysis indicates are being inappropriately accessed (e.g., denying all data access requests to a particular object or set of objects, denying access to a particular service, denying access to particular users or groups of users, suspending or terminating program instances, etc., and various combinations thereof). In at least some embodiments, the configurable computing resource service may respond to such an indication by asking the client a series of questions (e.g., invoking a security wizard), suggesting mitigation strategies (e.g., suggesting that credentials of a particular user be revoked, etc.) based on the responses, and implementing mitigation strategies approved by the client. In at least some embodiments, the client may specify actions to be taken by the configurable computing resource service in response to a received indication of a client security concern. The specified actions may vary based on a number of factors, such as the user providing the indication of the security concern, the time of day, a current level of activity associated with resources provided to the user by the configurable computing resource service, a physical connection employed to provide the indication of the security concern, etc., and various combinations thereof.

In at least some embodiments, the functionally related to securing provided computing resources in response to an indication from a client of a security concern may be provided by a computing resource service manager module.

For illustrative purposes, some embodiments are described herein in which specific types of computing resources and computing resource securing operations are performed. These examples are provided for illustrative purposes and are simplified for the sake of brevity, and the inventive techniques may be used in a wide variety of other situations, some of which are discussed herein.

FIG. 1 is a system diagram illustrating an example embodiment of a configurable computing resource service that enables remote clients to create and configure computing resources for use by the clients. In this example, a configurable computing resource service 105 provides such functionality to clients (not shown) over one or more public networks 100 (e.g., over the Internet). Thus, the remote clients may use the configurable computing resource service 105 to dynamically modify the number and/or capabilities of their computing resources, such as by using cloud computing techniques over the public networks 100.

In particular, in the example of FIG. 1, a number of clients (not shown) are interacting over a public network 100 with a configurable computing resources service system manager module 110 to create and configure various computing resources 120 to provide to clients, with at least some of the computing resources 120 being configured to enable secure private access from one or more corresponding client computing systems 130 over the public network 100 (e.g., via VPN connections established over interconnections 100a and 100b). In this example embodiment, the manager module 110 assists in providing functionality of the configurable computing resource service 105 to the remote clients, such as in conjunction with various other modules 115 of the configurable computing resource service 105 and various computing nodes 125 and networking devices 195 that are used by the configurable computing resource service 105 to provide the computing resources 120. In at least some embodiments, the manager module 110 may execute on one or more computing systems (not shown) of the configurable computing resource service 105, and may provide one or more APIs that enable remote computing systems to interact with the module 110 to access some or all functionality of the configurable computing resource service on behalf of clients (e.g., to create, configure, and/or initiate use of computing resources 120). In addition, in at least some embodiments, clients may instead manually interact with the module 110 (e.g., via a user interface provided by the module 110) to perform some or all such actions.

The public network 100 may be, for example, a publicly accessible network of linked networks, possibly operated by distinct parties, such as the Internet. The client computing systems 130 may each include one or more existing private networks, such as a corporate or other private network (e.g., home, university, etc.) that is partially or wholly inaccessible to non-privileged users, and that includes computing systems and/or other networked devices of a client. In the illustrated example, the provided computing resources 120 each include multiple computing nodes 125, at least some of which are provided by or otherwise under the control of the configurable computing resource service 105, and each of the provided computing resources 120 may be configured in various ways by the clients for whom they are provided.

Access between a client computing system 130 and corresponding computing resources 120 provided for a client may be enabled in various ways, such as by establishing a VPN connection or other secure connection between them that allows intercommunication over the public network 100 in a secure private manner. For example, the configurable computing resource service 105 may automatically perform appropriate configuration on its computing nodes and other computing systems to enable access to a particular computing resource 120 of a client, such as by automatically configuring one or more mechanisms hosted by the configurable computing resource service 105 (e.g., software and/or hardware mechanisms), and/or may automatically provide appropriate configuration information to the client (e.g., credentials, access points, and/or other parameters) to allow a mechanism hosted on the client computing systems 130 to establish the access.

As previously noted, the provided computing resources 120 may each be configured by clients in various manners. For example, in at least some embodiments, the configurable computing resource service 105 provides multiple computing nodes that are available for use to clients, such that each provided computing resource 120 may include a client-configured quantity of multiple such computing nodes that are dedicated for use as part of the provided computing resource.

In addition, in at least some embodiments, a client may interact with the module 110 to configure various access constraint information for a computing resource provided for the client (e.g., via one or more interactions with an API provided by the service 105), and such access constraint information may later be dynamically modified for a provided computing resource in at least some such embodiments, such as after the provided computing resource has already been in use by the client, in response to receipt of an indication of a security concern, etc. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which private or other specialized access has been established, external to the provided computer network and any corresponding remote client computer network, etc.); types of other computing systems; etc.

FIG. 2A is a display diagram illustrating an example of a display 200 that enables a client or one or more users associated with a client to manage services provided by a configurable computing resource service. A computing resource service may provide such as display as part of an interface allowing clients to create, configure and manage computing resources provided by the service. A user may typically receive display 200 after signing in to a client account with the service. The display 200 includes client summary information 201 describing the client and/or user associated with the client. As illustrated the client summary information 201 includes a client identification, a user identification and a user group to which the user belongs. The display 200 also includes computing resource summary information 203 related to services provided to the client. As illustrated, the computing resource summary information includes program execution service (PES) summary information and data storage service (DSS) summary information. Information summaries related to different or addition types of services provided by the computing resource service may be provided in some embodiments. The display 200 also includes a plurality of service tabs 205 which a user may select to bring up one or more displays related to various services provided by the computing resource service. The display 200 also includes an overview tab 207 which a user may select to return to the display 200 (for example from a display related to a particular service provided by the computing resource service). The display also includes a panic button 209, which a user may select to send an indication to the computing resource service that the user has a concern, such as a security-related concern. As illustrated, the button 209 is labeled "Click Here If You Are Scared." Different labels may be used in some embodiments (e.g., "PANIC," "HELP," "My Account Is Compromised," "Make me Secure," etc.) and the panic button 209 may be colored or otherwise highlighted (e.g., the button may be red in color). As discussed in more detail elsewhere, when the panic button 209 is selected by a user, the computing resource service may respond by automatically taking one or more actions to secure computing resources provided to the client by the service. For example, in response to a selection of the panic button, the service may automatically restrict access to all or a portion of the computing resources provided to the client (e.g., deny all access requests, deny access requests from selected users, deny access requests except from selected users, etc), request additional information from the user (e.g., through drop-down menus, etc), provide data to the user (e.g., usage information associated with user credentials, program instances, data accesses, etc.), terminating provided computing resources (e.g., terminating programs executing by a PES), politely suspending provided computing resources (e.g., saving cache data and powering down data storage devices allocated to the client, suspending pending program instances, etc), turn on activity logging, analyze usage data pertaining to resources provided to the client, run a port scan, run a penetration test, provide suggested mitigation responses to the client (e.g., suggest revoking credentials provided to a user such as based on access associated with the credentials, etc.), restore previously restricted access (e.g., restoring access to some or all computing resources previously restricted based responses to information requests or data analysis, etc.), obtain verification of actions to be taken (e.g., from the user or from one or more additional users associated with the client), etc., and various combinations thereof in various orders. The one or more actions taken may depend on various factors, such as the user who selected the panic button (e.g., the user's privileges, groups to which the user belongs, a default response for the user, etc.), the display from which the panic button was selected (e.g., the overview display 200, a display associated with a particular provided service, etc.), the purpose of the panic button (e.g., a "Make me Secure," button may have a different purpose than a "My Credentials are Compromised" button), responses (or the lack thereof) to requests for information presented to the user, analysis of the usage of the provided computing resources, the time of day, etc., and various combinations thereof.

Figure 2B:
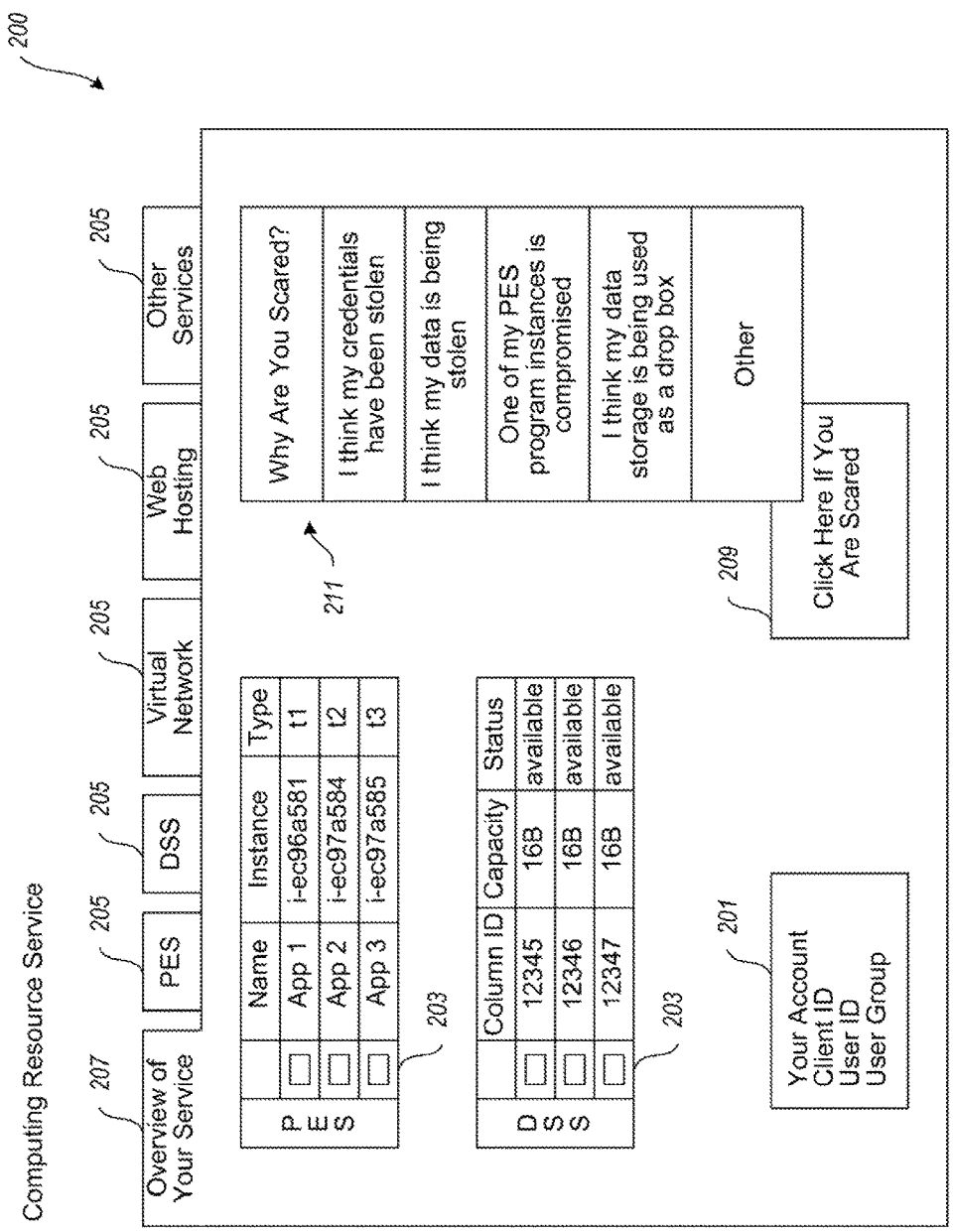

As discussed above, in some embodiments the service may initially respond to a selection of the panic button 209 by requesting additional information from the user, such as information pertaining to why the user selected the panic button 209, and at least partially basing the one or more actions to be taken to secure the provided resources on additional information provided by the user. FIG. 2B is a display diagram illustrating an example of the display 200 that is configured to provide a drop-down menu 211 in response to selection of the panic button 209. As illustrated in FIG. 2B, the drop-down menu 209 requests the user to indicate why the user selected the panic button 209, and presents various options which the user may select to provide the requested information to the service. As illustrated, the drop down menu 211 options include "I think my credentials have been stolen," "I think my data is being stolen," "One of my PES program instances is compromised," "I think my data storage is being used as a drop box," and "Other." The response to the drop down menu may be used by the service to select or control various actions to be taken to secure computing resources provided to the client by the service.

For example, if the user indicates user credentials have been compromised, the service may revoke or suspend all of a subset of outstanding credentials, display a list of all or a subset of outstanding credentials associated with the client and request the user to identify suspect credentials in the list, display a list of recent logs of events generated by the suspect credentials, suggest credentials to revoke or suspend, allow the user to select credentials to be revoked or reissued, etc., and various combinations thereof. In another example, if the user indicated data was being stolen, the service may isolate computing resources related to storage services provided to the client (e.g., isolate one or more buckets of a storage service organized as a number of buckets), isolate one or more objects stored for the client by a storage service, suggest isolating one or more related computing resources (such as based on a usage analysis), provide the user with an ability to select computing resources to be isolated, suggest actions to be taken, request confirmation of suggested actions, etc., and various combinations thereof. In another example, if the user indicates one of its program instances is compromised, the service may suspend or terminate the program instance, may present a list of active program instances and related data and allow the user to select program instances to suspend or terminate, may turn on or suggest turning on logs, etc., and various combinations thereof. In another example, if the user indicated data storage resources were being used as a drop box, the service may isolate computing resources related to storage services provided to the client (e.g., isolate one or more buckets of a storage service organized as a number of buckets), suggest isolating one or more related computing resources (such as based on a usage analysis), provide the user with an ability to select computing resources to be isolated, etc., and various combinations thereof.

Figure 2C:
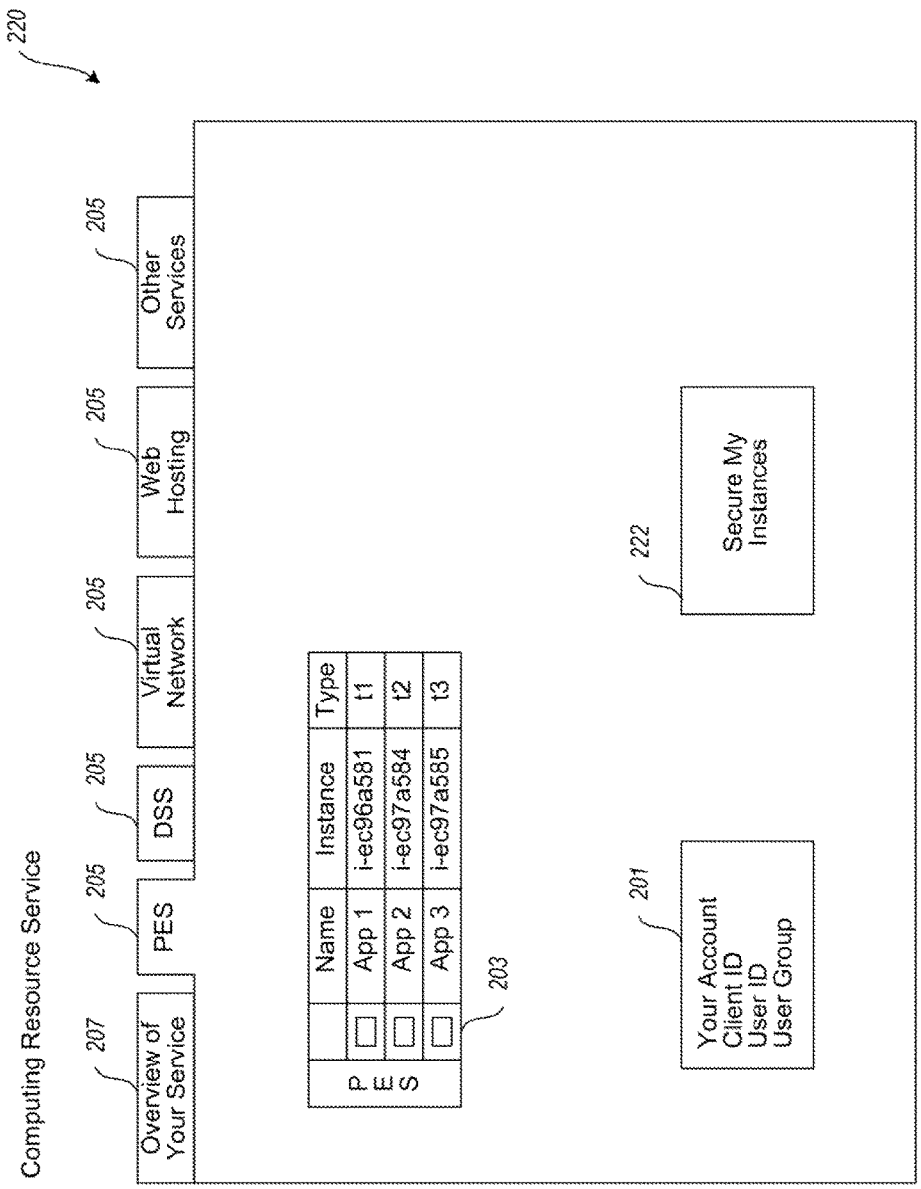

FIG. 2C is a display diagram illustrating an example of a display 220 that enables a client or one or more users associated with a client to manage program execution services provided by a configurable computing resource service. A computing resource service may provide such a display as part of an interface allowing clients to create, configure and manage computing resources provided by the service. A user may typically receive display 220 by selecting a tab 205 associated with a program execution service in an overview display (see, e.g., display 200 of FIG. 2A). The display 220 includes client summary information 201 describing the client and/or user associated with the client. As illustrated the client summary information 201 includes a client identification, a user identification and a user group to which the user belongs. The display 220 also includes computing resource summary information 203 related to program execution services provided to the client. Information summaries related to different or addition types of services provided by the computing resource service may be provided in some embodiments. The display 220 also includes a plurality of service tabs 205 which a user may select to bring up one or more displays related to various other services provided by the computing resource service. The display 220 also includes an overview tab 207 which a user may select to return to an overview display (for example, the display 200 of FIG. 2A). The display also includes a panic button 222, which a user may select to send an indication to the computing resource service that the user has a concern, such as a security-related concern. As illustrated, the button 222 is labeled "Secure My Instances". Different labels may be used in some embodiments (e.g., "PANIC," "HELP," "My Account Is Compromised," "Make me Secure," etc.) and the panic button 222 may be colored or otherwise highlighted (e.g., the button may be red in color). As discussed in more detail elsewhere, when the panic button 222 is selected by a user, the computing resource service may respond by automatically taking one or more actions to secure computing resources provided to the client by the service, such as to secure resources provided by a program execution service of the computing resource service. For example, in response to a selection of the panic button, the service may automatically restrict access to all or a portion of the computing resources provided to the client (e.g., deny all access requests, deny access requests from selected users, deny access requests except from selected users, etc), request additional information from the user (e.g., through drop-down menus, a security wizard, etc), provide data to the user (e.g., usage information associated with user credentials, program instances, data accesses, etc.), terminate provided computing resources (e.g., terminate programs executing by a PES), politely suspend provided computing resources (e.g., suspend pending program instances, etc), turn on activity logging, analyze usage data pertaining to resources provided to the client, run a port scan, run a penetration test, provide suggested mitigation responses to the client (e.g., suggest revoking credentials provided to a user such as based on access associated with the credentials, etc.), restore previously restricted access (e.g., restoring access to some or all computing resources previously restricted based responses to information requests or data analysis, etc.), obtain verification of actions to be taken (e.g., from the user or from one or more additional users associated with the client), etc., and various combinations thereof in various orders. The one or more actions taken may depend on various factors, such as the user who selected the panic button (e.g., the user's privileges, groups to which the user belongs, a default response for the user, etc.), the display from which the panic button was selected (e.g., the PES display 220, etc.), the purpose of the panic button (e.g., a "Make me Secure," button may have a different purpose than a "My Credentials are Compromised" button), responses (or the lack thereof) to requests for information presented to the user, analysis of the usage of the provided computing resources, the time of day, etc., and various combinations thereof.

As discussed above, in some embodiments the service may initially respond to a selection of the panic button 220 by requesting additional information from the user, such as information pertaining to why the user selected the panic button 220, and at least partially basing the one or more actions to be taken to secure the provided resources on additional information provided by the user.

Other interfaces may be employed. For example, in some embodiments, selection of a panic button (e.g., panic button 209 of FIG. 2A, panic button 220 of FIG. 2C, etc.) may activate a security wizard, which may initiate actions to increase security for the provided computing resources, ask users to respond to various questions related to security issues, initiate various analysis of usage data and/or testing related to security issues to determine what is going wrong (e.g., simulated attacks, port scans, penetration tests, password tests, analysis of data usage (e.g., to detect anomalies such as a spike in client data retrieval that does correspond to an expected usage level based on purchases of downloads from the client, etc.) etc.), provide test results and/or other data, present a list of suggest actions to take to the user, allow the user to select actions from the list, and initiate the selected actions, and various combinations thereof. For example, selection of a "Make Me Secure" button may activate a security wizard which performs various testing related to security issues, asks a series of questions of a user, provides a list of one or more selected actions to the user for selection and/or approval, and initiates the selected and/or approved actions.

For example, if the user indicates user credentials have been compromised, the service may revoke or suspend all of a subset of outstanding credentials, display a list of all or a subset of outstanding credentials associated with the client and request the user to identify suspect credentials in the list, display a list of recent logs of events generated by the suspect credentials, suggest credentials to revoke or suspend, allow the user to select credentials to be revoked or reissued, etc., and various combinations thereof. In another example, if the user indicated data was being stolen, the service may isolate computing resources related to storage services provided to the client (e.g., isolate one or more buckets of a storage service organized as a number of buckets), isolate one or more objects stored for the client by a storage service, suggest isolating one or more related computing resources (such as based on a usage analysis), provide the user with an ability to select computing resources to be isolated, suggest actions to be taken, request confirmation of suggested actions, etc., and various combinations thereof. In another example, if the user indicates one of its program instances is compromised, the service may suspend or terminate the program instance, may present a list of active program instances and related data and allow the user to select program instances to suspend or terminate, may turn on or suggest turning on logs, etc., and various combinations thereof. In another example, if the user indicated data storage resources were being used as a drop box, the service may isolate computing resources related to storage services provided to the client (e.g., isolate one or more buckets of a storage service organized as a number of buckets), suggest isolating one or more related computing resources (such as based on a usage analysis), provide the user with an ability to select computing resources to be isolated, etc., and various combinations thereof.

Figure 3:
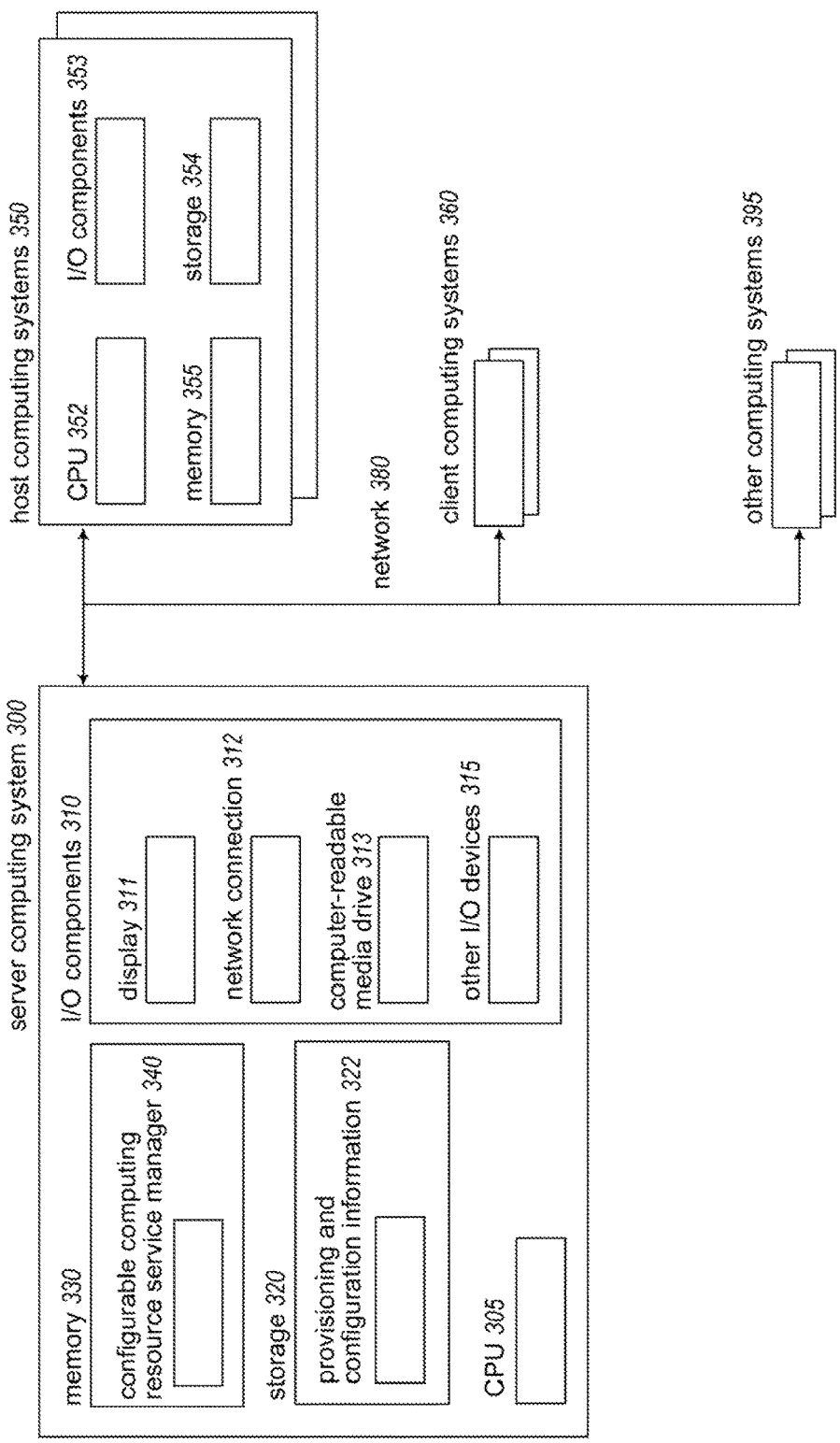
FIG. 3 is a block diagram illustrating example computing systems suitable for executing an embodiment of a system for providing computing resources for use by remote clients.

FIG. 3 is a block diagram illustrating example computing systems suitable for executing an embodiment of a system for providing computing resources for use by remote clients. In particular, FIG. 3 illustrates a server computing system 300 suitable for executing an embodiment of a configurable computing resource service system manager module that assists in providing a configurable computing resource service, as well as various host computing systems 350, client computing systems 360 and other computing systems 395. While not illustrated here, in some embodiments at least some of the illustrated computing systems may be co-located or otherwise associated (e.g., the server computing system 300 and at least some of the host computing systems 350 that are part of the configurable computing resource service), such as at a data center (not shown). In addition, while not illustrated here, various other modules of the configurable computing resource service may be present and used in at least some embodiments, such as various node communication manager modules, program execution service manager modules, data storage service manager modules, external communication manager modules, etc.

In the illustrated embodiment, the server computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated host computing systems 350 have components similar to those of server computing system 300, including a CPU 352, I/O components 353, storage 354, and memory 355. The client computing systems 360 and the other computing systems 395 may also each include similar components to some or all of the components illustrated with respect to server computing system 300, but such components are not illustrated in this example for the sake of brevity.

An embodiment of a configurable computing resource service (CCRS) manager module 340 is executing in memory 330, and it interacts with computing systems 350, 360 and 395 over one or more networks 380 (e.g., via the Internet and/or the World Wide Web, via a private cellular network, via a private substrate network in use by the configurable computing resource service, etc.). In this example embodiment, the module 340 includes functionality related to providing and managing computing resources for use by various clients (not shown) as part of a configurable computing resource service, with the clients using computing systems 360 to configure and access the provided computing resources. The host computing systems 350 may also assist in providing the configurable computing resource service, such as by providing computing nodes for a program execution service, storage for a data storage service, etc., provided by the configurable computing resources service. Similarly, in at least some embodiments, at least some of the other computing systems 395 may also assist in providing the configurable computing resources service, such as by facilitating intercommunications between provided computing resources and external remote computing systems (e.g., by implementing VPN connections or other access mechanisms), by providing remote resource services that the provided computing resources are configured to access, by facilitating intercommunications between computing resources (e.g., by implementing portions of a substrate network or other infrastructure of the configurable computing resource service that facilitates the communications), etc.

The other computing systems 350, 360 and 395 may be executing various software as part of interactions with the module 340. For example, some or all of the client computing systems 360 may each be executing software in memory to interact with module 340 (e.g., as part of a Web browser or specialized client-side application program), such as to enable a user of a client computing system to create and configure a computer network for use by the user or other client of the configurable computing resource service. Furthermore, some or all of the client computing systems 360 and/or other computing systems 395 may each be executing software in memory to interact on behalf of a client with a computing resource being provided by the configurable computing resource service for the client, such as via a VPN connection that connects multiple of the client computing systems 360 and/or other computing systems 395 to multiple of the host computing systems 350 that provide computing resources for the client's use. In addition, one or more users of the client computing systems 360 may interact with module 340 to perform various other types of actions (e.g., administrative functions related to accounts of clients with the configurable network service, to monitor use of provided computer networks, to provide an indication of a client security concerns, etc.), as discussed in greater detail elsewhere. Furthermore, some of the host computing systems 350 and/or the other computing systems 395 may execute software modules (not shown) to assist in providing the configurable computing resource service, such as node communication manager modules that assist in managing communications sent to and from computing nodes of provided computing resources. In addition, other of the computing systems 360 and 395 may perform other functions, such as to execute remote resource services available to various users. Various information related to the functionality of module 340 and the configurable computing resource service may also be stored in storage 320, such as provisioning and configuration information 322, related to configuration and/or provision of computing resources on behalf of multiple clients.

After the module 340 receives one or more requests (or other indications) to create and configure a computing resource for a client, the module 340 may perform various actions as discussed in greater detail elsewhere. Such actions may including selecting one or more computing nodes from the host computing systems 350 that will be part of the computing resources provided, configuring those host computing systems and/or other computing systems to provide those computing resources network. In addition, the module 340 may further interact with host computing systems 350 to manage computing resource being provided, such as in response to requests from clients or instead as automatically determined, including in some situations to increase or decrease the quantity of computing resources that are provided (e.g., reducing computing nodes of a provided computer network, migrating programs executing on one or more computing nodes to other computing nodes), etc. In addition, the module 340 may monitor or otherwise interact with one or more of the host computing systems 350 to track use and operation of the provided computing resources.

It will be appreciated that computing systems 300, 350, 360 and 395 are merely illustrative and are not intended to limit the scope of the present disclosure. The computing systems and/or computing nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware or software that may interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated module 340 may in some embodiments be distributed in additional modules, or the module 340 may incorporate functionality described elsewhere as being provided by multiple modules of the configurable computing resource service (e.g., one or more system manager modules, one or more node communication manager modules, and one or more external communication manager modules). Similarly, in some embodiments, some of the functionality of the module 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
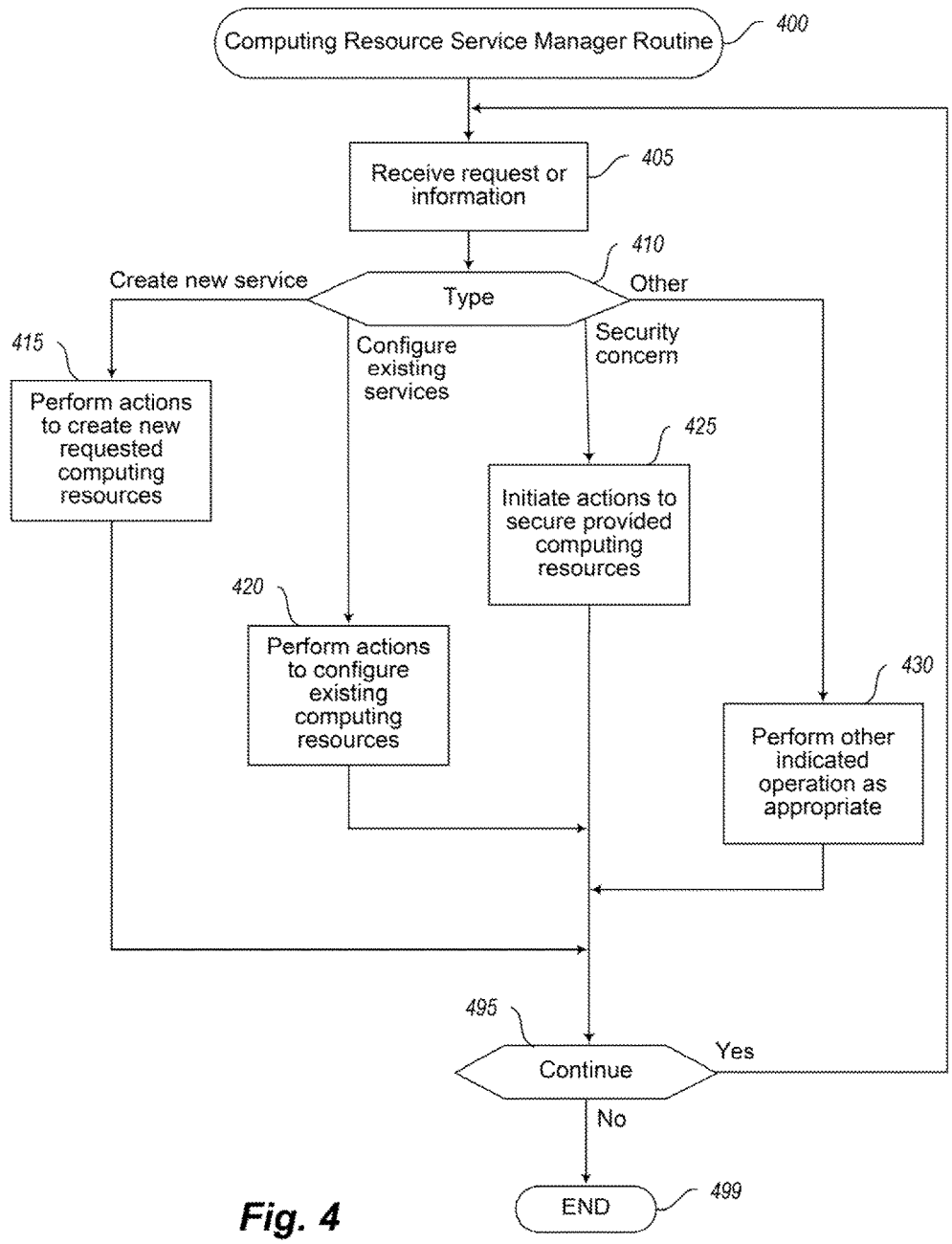
FIG. 4 illustrates a flow diagram of an example embodiment of a computing resource service manager routine.

FIG. 4 illustrates a flow diagram of an example embodiment of a configurable computing resource service manager routine 400. The routine may be provided by, for example, execution of the configurable computing resource system manager module 110 of FIG. 1, or the system manager module 340 of FIG. 3, such as to assist in managing operations of a configurable computing resource service that provides computing resources to clients.

The illustrated embodiment of the routine begins at block 405, where an indication is received of a message from a client or other information that is received. In at least some embodiments, the configurable computing resource service that the routine 400 supports provides one or more APIs to allow remote clients to programmatically interact with the configurable computing resource service, and if so some or all of the indications received in block 405 may be made via invocations or other programmatic interactions of remote clients with those APIs, while in other embodiments and situations, some or all of the indications received in block 405 may instead be initiated by remote clients or others in other manners.

After block 405, the routine continues to block 410 to determine a type of the indication received in block 405. When it is determined that the indication received in block 405 is to initiate the creation of new computing resources to be provided on behalf of a requesting client, such as resources related to new or existing program execution services, new or existing data storage services, etc., requested by the client, the routine continues to block 415 to perform various actions to create the requested computing resources for use on behalf of the client. For example, the received communication to create the new computing resources may include various configuration information related to the computing resources to be created, such as the type of computing resources to be created, a number of computing nodes that are to be part of the created computing resources, an indication of whether the new computing resources are an extension to existing computing resources, etc. The actions taken in block 415 may include, for example, selecting particular computing nodes, storage devices, etc., that are available from the configurable computing resource service for use in providing the new computing resources that are being created; generating and associating a unique identifier with the new computing resources that are being created; storing any received configuration information for later use; etc. Computing nodes, storage devices, etc., to be used to provide the requested computing resources may be selected in various manners in various embodiments, such as based on capabilities of the selected resources, based on network locations of the selected resources, based on geographic locations of the selected resources (e.g., in one of multiple geographically distributed data centers, on a relative geographic location to other resources, etc.), in a random manner, etc. Furthermore, while not illustrated here, the routine may provide to the client the unique identifier for the new computing resources or other reference for the computing resources, so as to allow the client to later reference the new computing resources when performing further configuration of the new computing resources. The routine 400 proceeds from block 415 to block 495.

When it is determined in block 410 that the indication received in block 405 is a request to configure existing computing resources, the routine continues to block 420 to perform various actions to configure the existing computing resources provided on behalf of a requesting client, such as resources used in connection with program execution services, data storage services, etc., provided to the client. For example, the received communication to configure the existing computing resources may include various configuration information related to the computing resources, such as users who are permitted to use the computing resources, permitted or desired data access rates, etc. The routine 400 proceeds from block 420 to block 495.

When it is determined at block 410 that the indication received in block 405 is an indication of a client or user security concern related to computing resources provided to the client (e.g., an indication that a user has selected a panic button), the routine proceeds from block 410 to block 425, where the routine initiates one or more actions to secure the provided resources. Initiating the one or more actions may include calling a subroutine, such as the subroutine 500 illustrated in FIG. 5. As discussed in more detail elsewhere, the one or more actions may include automatically restricting access to all or a portion of the computing resources provided to the client, terminating provided computing resources, politely suspending provided computing resources, turning on activity logging, analyzing usage data pertaining to resources provided to the client, running tests, providing suggested mitigation responses to the client, restoring previously restricted access, obtaining verification of actions to be taken, etc., and various combinations thereof in various orders. It is noted that some embodiments may employ various criteria to determine whether a received indication of a client concern is a valid indication of a client concern. For example, some embodiments may require a certain number of users to agree that a security concern is presented, at least some actions to secure provided resources may require approval from more than one user, etc. Other criteria may be employed to determine whether an indication of a security concern is a valid indication. For example, a selection of a panic button by a user at a time when the user is off-duty may be disregarded, or prompt a request for confirmation by another user, etc. The routine 400 proceeds from block 425 to block 495.

When it is determined at block 410 that the indication received at block 405 is a type of indication or request other than a request for new computing resources, a request to configure computing resources, or an indication of a security concern, the routine 400 proceeds from block 410 to block 430, where other indicated operations may be performed as appropriate. For example, an indication or request received at block 405 may be a request to provide billing-related information to a client. The routine 400 proceeds from block 430 to block 495.

At block 495, the routine determines whether to continue, such as until an explicit indication to terminate is received. If it is determined to continue, the routine returns to block 405, and if not continues to block 499 and ends.

Figure 5:
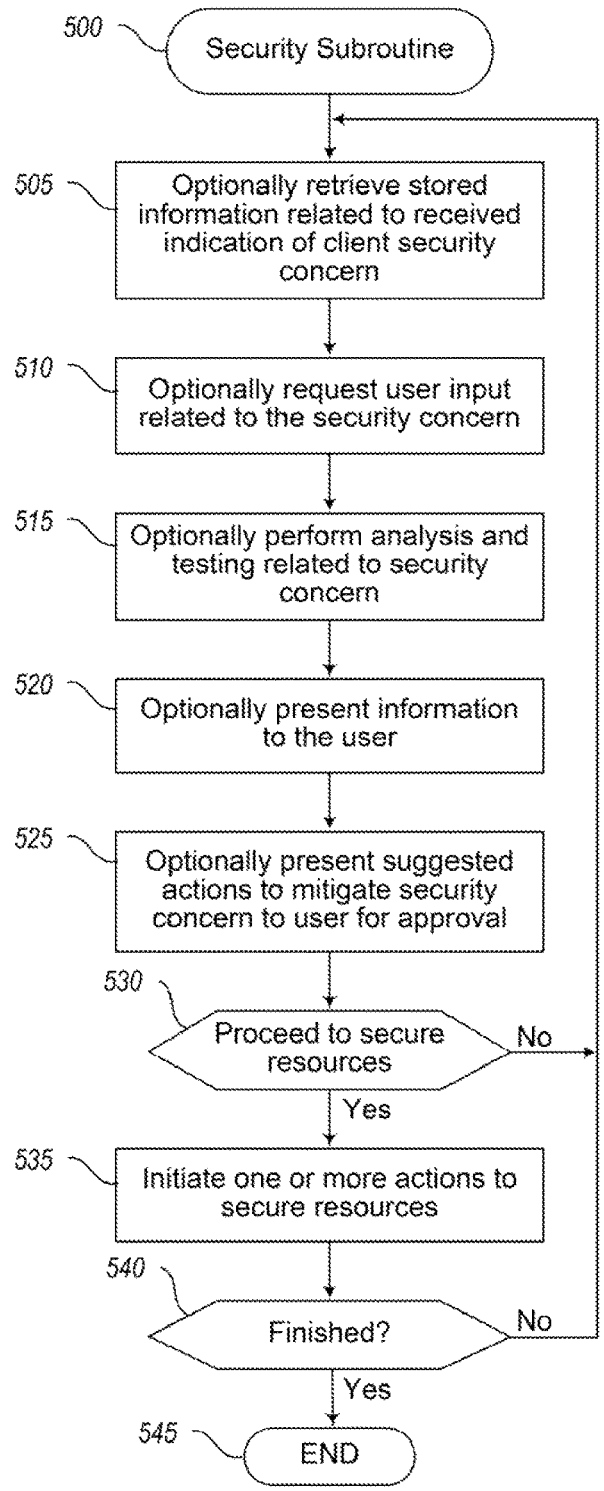
FIG. 5 illustrates a flow diagram of an example embodiment of a security subroutine that may be called by a computing resource service manager routine.

FIG. 5 is a flow diagram for an example embodiment of a security subroutine that may be called by a computing resource service manager routine in response to receipt of an indication of a client security concern. For example, the subroutine 500 may be called by block 425 of the routine 400 illustrated in FIG. 4 in response to selection of a panic button by a user associated with a client, and may be passed certain information, such as the received indication of the client security concern and associated client, user and computing resource identification information.

The subroutine 500 proceeds to block 505, where it optionally retrieves stored information related to the received indication of a client security concern, such as indications of default actions to be taken to secure provided computing resources in response to selection of a panic button by a user associated with the client, indications of permitted and prohibited actions to be taken in connection with securing provided computing resources (which may, for example, be user specific), indications of required permissions to be obtained before taking actions, etc. It is noted that user-specific actions to be taken in connection with securing provided computing resources in response to selection of a panic button may include actions the specific user would not ordinarily be permitted to do. For example, the actions to be taken may include isolating an object the user may not ordinarily be permitted to isolate. The subroutine 500 proceeds from block 505 to block 510.

At block 510, the subroutine optionally requests user input related to the received indication of a client security concern. For example, the subroutine may request user input regarding the nature of the security concern, the activities giving rise to the security concern, etc. The information may be requested in various manners, such as through a user interface (e.g., a drop down menu or a security wizard), etc. The subroutine proceeds from block 510 to block 515.

At block 515, the subroutine optionally performs analysis related to the received indication of a client security concern. For example, the subroutine may analyze computing resource use information (e.g., instance information, data storage and retrieval information, etc), perform various tests, such as penetration tests, etc. The subroutine proceeds from block 515 to block 520.

At block 520, the subroutine 500 optionally presents information to the user related to the client security concern, such as computing resource usage information (e.g., active instances, data storage and retrieval information, outstanding credentials and associated usage information, etc.), the results of analysis and testing, etc. The subroutine 500 proceeds from block 520 to block 525.

At block 525, the subroutine 500 optionally presents suggested actions to mitigate the security concern to the user for approval, such as restricting particular users, isolating particular objects or buckets, revoking or reissuing credentials, etc., as discussed in more detail elsewhere herein. The subroutine proceeds from block 525 to block 530.

At block 530, the subroutine 500 optionally determines whether to proceed to initiate one or more actions to secure the provided computing resources. For example, the subroutine 500 may iteratively retrieve, request and present information and conduct testing and analysis before initiating one or more actions to secure providing computing resources. For example, in response to received user input requested in block 510, the subroutine may present information in block 520 and determine in block 530 to return to block 510 to request additional user input. When it is determined at block 530 not to proceed to initiate one or more actions to secure provided computing resources, the routine 500 proceeds from block 530 to block 505.

When it is determined at block 530 to proceed to initiate one or more actions to secure the provided computing resources, the routine 500 proceeds from block 530 to block 535, where the routine initiates one or more actions to secure the provided resources. As discussed in more detail elsewhere, the one or more actions may include automatically restricting access to all or a portion of the computing resources provided to the client, terminating provided computing resources, politely suspending provided computing resources, turning on activity logging, revoking and reissuing credentials, isolating objects and buckets, releasing previously imposed restrictions, etc., and various combinations thereof in various orders. The actions to be initiated may be selected, for example, based on information retrieved in block 505 (e.g., default actions to be taken), information provided in response to a request in block 515 (e.g., information regarding the nature of the security concern), analysis and testing performed in block 515, approvals obtained or denied in block 525, etc. The routine 500 proceeds from block 535 to block 540.

At block 540, the subroutine determines whether it is finished. For example, as discussed elsewhere herein, the subroutine may be iterative. For example, in a first pass the subroutine 500 may immediately take default steps to secure provided resources (e.g., initiating immediate suspension of access to certain resources by certain users, initiating immediate isolating of one or more objects or buckets, etc.). The subroutine 500 may determine after a pass that it is not finished, for example, in order to request user input regarding previously initiated actions, conduct analysis (such as analysis of the results of previously initiated actions), etc. For example, the subroutine may have initiated suspension of access to a large number of objects, such as all objects associated with a user, based on default actions to be initiated. The subroutine may determine it is not finished so as to provide the user with an opportunity to indicate (for example in block 510 or block 525) that previously suspended access to certain objects should be allowed. In another example, the subroutine 500 may determine that it is not finished so that information regarding the initiated actions may be presented to the user (for example in block 520).

When it is determined in block 540 that the subroutine 500 is not finished, the subroutine proceeds from block 540 to block 505. When it is determined in block 540 that the subroutine is finished, the subroutine proceeds to block 545 where it ends, optionally returning information, such as the initiated actions taken to secure the provided computing resources in block 535, the value of any desired variables, billing information, etc.

It will be appreciated that in some embodiments the functionality provided by the routines discussed above may be provided in alternative ways, such as being split among more routines or consolidated into fewer routines.

Similarly, in some embodiments illustrated routines may provide more or less functionality than is described, such as when other illustrated routines instead lack or include such functionality respectively, or when the amount of functionality that is provided is altered. For example, some embodiments may provide notifications (such as to other users) when an indication of a client security concern is received, when certain actions to secure the provided resources are initiated, etc. In another example, some embodiments may immediate initiate one or more actions to secure provided resources and terminate, without performing, for example, any of the optional blocks illustrated in FIG. 5 (e.g., some or all of the optional blocks may be skipped). Some embodiments may present an interface having a button which a client may select to provide an indication of a client-identified problem, and the service may respond by automatically initiating one or more actions to resolve the client-identified problem. For example, a data storage management interface may present a client with a button labeled, for example, "Please help me, my object appears to be missing or corrupt," and a service may respond to selection of the button by initiating one or more actions to resolve problems with an object the client is attempting to access, such as isolating the object, making a copy of the object, reconstructing the object, etc. Such an embodiment may request additional information, conduct analysis and testing, present information, obtain confirmation of one or more actions to initiate, etc.

In addition, while various operations may be illustrated as being performed in a particular manner (e.g., in serial or in parallel) and/or in a particular order, those skilled in the art will appreciate that in other embodiments the operations may be performed in other orders and in other manners.

Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method, comprising:
providing, by a computing resource service executing on one or more computing systems, a plurality of computing resources to multiple users of the computing resource service;
receiving, at the one or more computing systems via one or more interfaces, configuration information from a remote user of the multiple users for computing resources requested by the remote user;
configuring, by the one or more computing systems, one or more computing devices of the computing resource service based on the received configuration information, and using the configured one or more computing devices to provide the requested computing resources for the remote user;
receiving, at the one or more computing systems via the one or more interfaces, and from a client computing device of the remote user, security information provided by the remote user regarding a security event currently occurring with the provided requested computing resources, the security event having been detected by the remote user at the client computing device; and
initiating, by the one or more computing systems and in response to the received security information, one or more actions to address the security event detected by the remote user by securing the provided requested computing resources.

2. The method of claim 1 wherein the providing of the requested computing resources includes executing one or more programs for the remote user on the one or more computing devices, and wherein the one or more actions include revoking one or more access keys associated with the provided requested computing resources to deny all access to the provided requested computing resources.

3. The method of claim 1 wherein the computing resource service is a fee-based service that is accessible to the remote user via one or more public computer networks, wherein the remote user is a customer of the computing resource service who provides payment to the computing resource service for the provided requested computing resources, and wherein the one or more interfaces include a user-selectable button that is displayed to the remote user in a graphical user interface and that, when selected by the remote user, causes the security information to be provided.

4. A computer-implemented method, comprising:
   allocating, by a computing resource service executing on one or more computing systems, computing resources of the computing resource service for use by a first client;
   receiving, at the one or more computing systems via one or more interfaces, and from a client computing device of the first client, an indication provided by the first client of a security concern that is occurring related to the allocated computing resources and that has been determined by the first client at the client computing device; and
   initiating, by the one or more computing systems and in response to the received indication, one or more actions to secure the allocated computing resources from the security concern determined by the first client.

5. The method of claim 4 further comprising responding to the received indication by requesting additional information from the first client via the one or more interfaces, and wherein the initiating of the one or more actions to secure the allocated computing resources is based at least in part on a response from the first client to the request for additional information.

6. The method of claim 5 wherein the requesting of the additional information includes presenting the first client with a list of security concerns and prompting the first client to select one or more of the listed security concerns.

7. The method of claim 6 wherein the requesting of the additional information further includes presenting the first client with a list of one or more recommended actions and prompting the first client to select one or more of the recommended actions, and wherein the initiating of the one or more actions includes performing the selected one or more recommended actions.

8. The method of claim 5 wherein the requesting of the additional information includes presenting the first client with a list of one or more recommended actions and prompting the first client to select one or more of the recommended actions, and wherein the initiating of the one or more actions includes performing the selected one or more recommended actions.

9. The method of claim 5 further comprising analyzing the received indication to determine possible responses to the security concern determined by the first client, and wherein the initiating of the one or more actions to secure the allocated computing resources is based at least in part on the analyzing.

10. The method of claim 4 further comprising gathering information about the allocated computing resources and responding to the received indication by analyzing the gathered information, and wherein the initiating of the one or more actions to secure the allocated computing resources is based at least in part on the analyzing.

11. The method of claim 4 wherein the allocated computing resources include computing resources allocated by a program execution service of the computing resource service to execute one or more programs for the first client, and wherein the one or more actions to secure the allocated computing resources includes revoking one or more access keys associated with the allocated computing resources to cause all access to the allocated computing resources to be denied.

12. The method of claim 4 wherein the computing resource service is a fee-based service that is accessible to the first client via public computer networks, wherein the first client is a customer of the computing resource service who provides payment to the computing resource service for the allocated computing resources, and wherein the one or more interfaces include at least one button that is displayed to the first client in a graphical user interface and that, when selected by the first client, causes the indication to be provided.

13. The method of claim 4 wherein the allocated computing resources include one or more data storage devices provided by a data storage service of the computing resource service to store data for the first client, and wherein the one or more actions to secure the allocated computing resources includes one or more of:
   powering down the one or more provided data storage devices; and
   restricting access to the stored data.

14. The method of claim 4 wherein the one or more interfaces include a graphical user interface configured to display a user-selectable button on the client computing device of the first client, and wherein the first client provides the indication by selecting the user-selectable button.

15. The method of claim 4 wherein the one or more interfaces are provided to multiple users that include the first client, and wherein the initiating of the one or more actions to secure the allocated computing resources is based at least in part on an identification of the first client who provided the indication.

16. The method of claim 15 wherein the initiating of the one or more actions to secure the allocated computing resources includes requesting permission to perform the one or more actions from two or more users of the multiple users.

17. A non-transitory computer-readable medium having stored contents that, when executed, configure a computing system to:
   allocate, by a computing resource service executing on the computing system, computing resources of the computing resource service for use by a first client;
   receive, at the computing resource service from a client computing device of the first client, and via one or more provided interfaces, an indication from the first client of a problem related to the allocated computing resources that is first identified by the first client while the problem is occurring; and
   in response to the received indication, initiate, by the computing system, an action to resolve the problem identified by the first client.

18. The non-transitory computer-readable medium of claim 17 wherein the stored contents include instructions that, when executed, program the computing system to determine the action to initiate based at least in part on providing information to the first client about recommended actions and receiving a response from the first client that selects the action to initiate from the recommended actions.

19. The non-transitory computer-readable medium of claim 17 wherein the computing resource service provides at least one of program execution services and data storage services to clients.

20. The non-transitory computer-readable medium of claim 17 wherein the stored contents further configure the computing system to respond to the indication by requesting additional information from the first client, and wherein the initiating of the one or more actions is based at least in part on a response from the first client to the request for additional information.

21. The non-transitory computer-readable medium of claim 17 wherein the initiating of the one or more actions includes initiating a plurality of actions to resolve the problem identified by the first client.

22. A computing system, comprising:
one or more processors of one or more computer systems; and
a manager module of a computing resource service that, when executed by at least one of the one or more processors, configures the at least one processor to:
provide computing resources of the computing resource service for use by a first client; and
initiate, in response to receipt at the computing resource service of an indication of a problem related to the provided computing resources that has been first identified by the first client and that is provided by the first client to the computing resource service from a client device of the first client via one or more provided interfaces, one or more actions to resolve the problem identified by the first client.

23. The computing system of claim 22 wherein the manager module includes software instructions that, when executed by the at least one processor, further configures the at least one processor to determine the one or more actions to initiate based at least in part on providing information to the first client about recommended actions and receiving a response from the first client that selects the one or more actions to initiate from the recommended actions.

24. The computing system of claim 22 wherein the manager module further configures the at least one processor to manage a plurality of computing devices for use in providing a plurality of computing resources to the clients of the computing resource service, and wherein the computing resources provided to the first client are a subset of the plurality of computing resources.

25. The computing system of claim 22 wherein the computing resource service provides program execution services or data storage services to the first client.

26. The computing system of claim 22 wherein the initiating one or more actions includes initiating a plurality of actions.

* * * * *